Aug. 4, 1936.   J. JONES   2,050,181
SIGNAL DEVICE
Filed Dec. 24, 1934   2 Sheets-Sheet 1
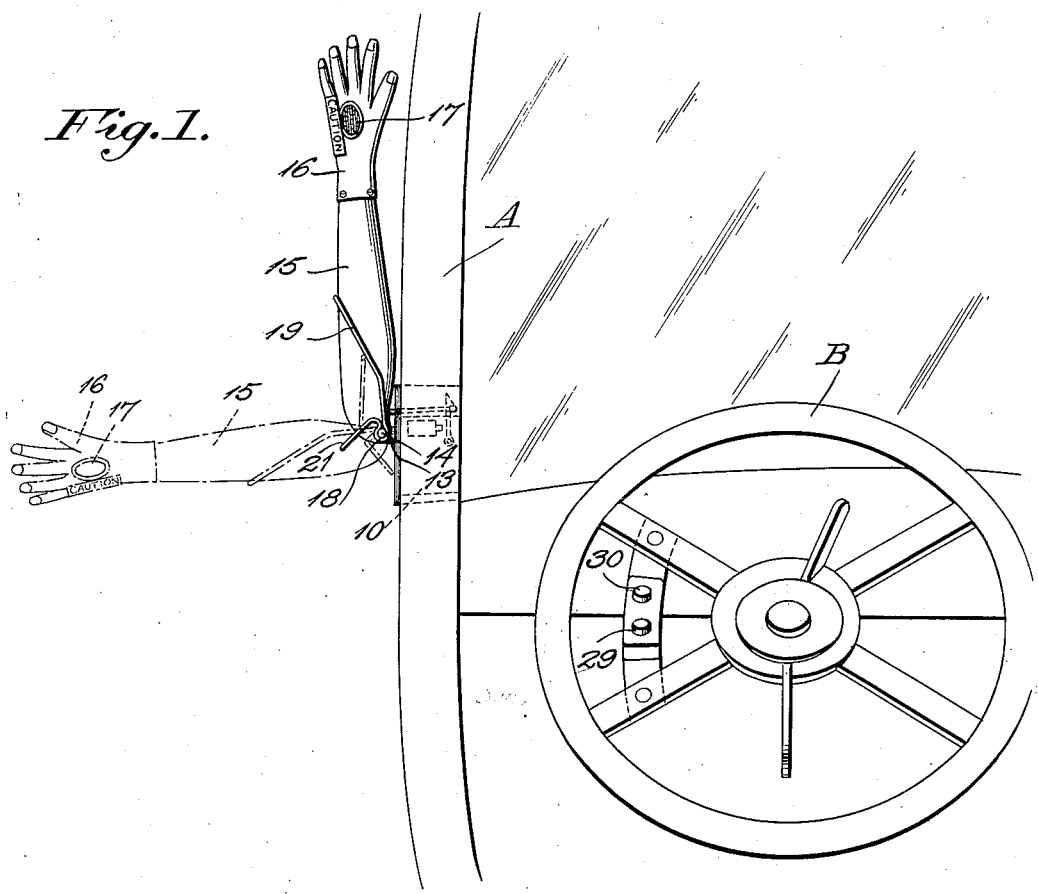
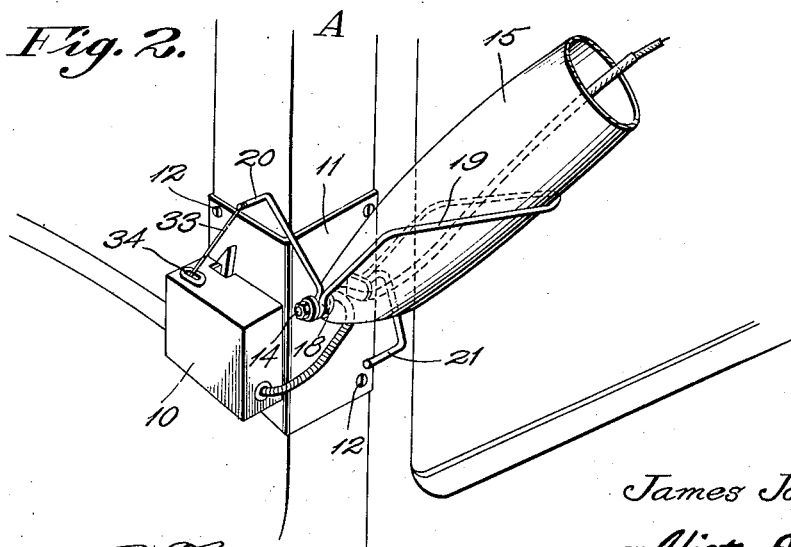
James Jones
INVENTOR
BY Victor J. Evans & Co.
ATTORNEY
WITNESS:

Aug. 4, 1936.  J. JONES  2,050,181
SIGNAL DEVICE
Filed Dec. 24, 1934  2 Sheets-Sheet 2
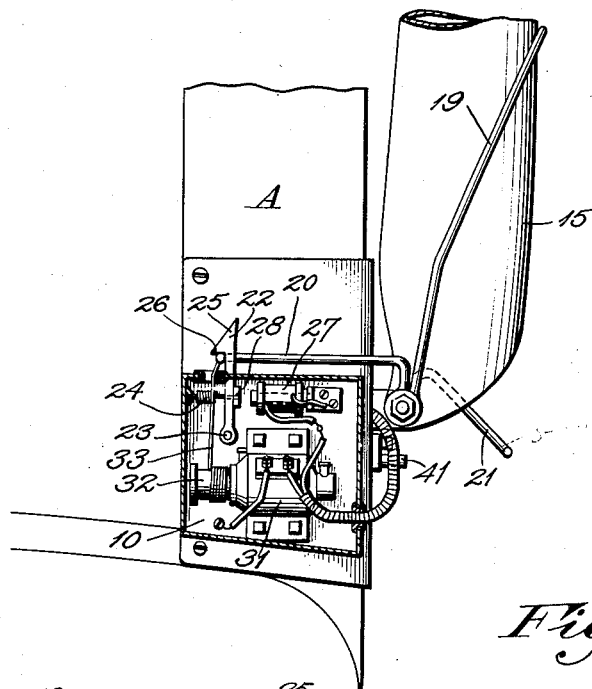
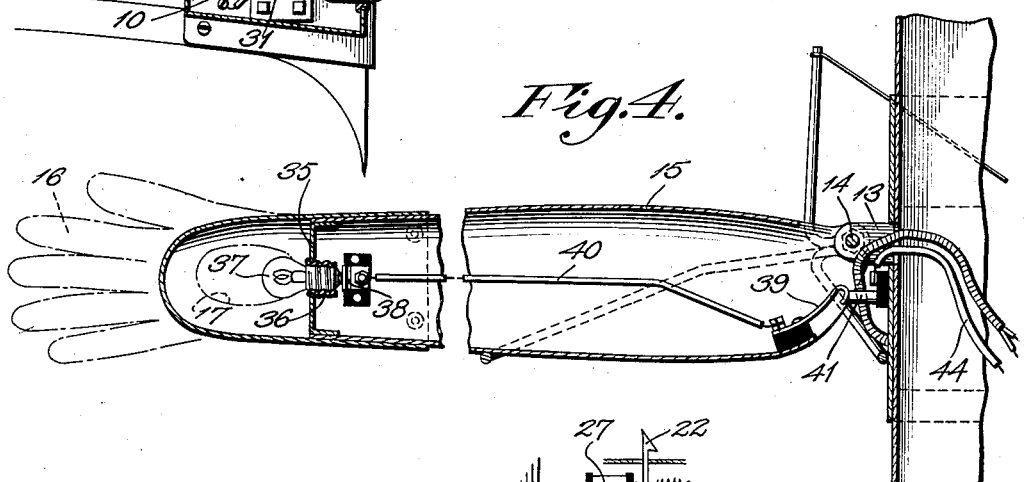
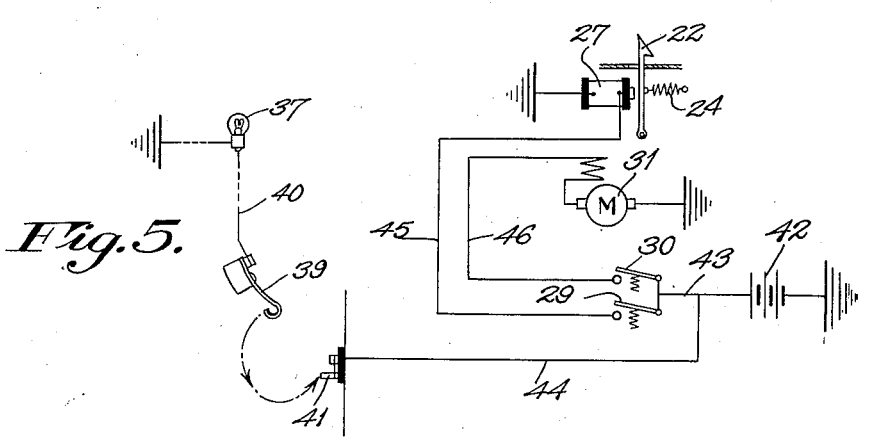
James Jones
INVENTOR
BY Victor J. Evans & Co.
ATTORNEY
WITNESS:

Patented Aug. 4, 1936

2,050,181

UNITED STATES PATENT OFFICE 2,050,181

SIGNAL DEVICE

James Jones, Wyatt, Mo.

Application December 24, 1934, Serial No. 759,091

2 Claims. (Cl. 177—329)

The invention relates to signal devices intended to be used on automobiles to take the place of the usual hand signal which is given by the driver prior to making a turn or stopping and has for its general object the provision of a novel electrically operated mechanical device for this purpose which will operate positively and which requires no effort on the part of the driver other than the mere pressing of a push button located at some convenient point, preferably upon the steering wheel in easy reach of the fingers.

An important object of the invention is to provide a device of this character which is constructed to resemble the human hand and which is normally in upright non-signalling position but which is quickly and easily releasable to permit it to drop into horizontal signalling position, electrically operated means being also provided for restoring the signal arm to its upright position when such is desired.

Another object of the invention is to provide a signal device of this character in which the signal arm contains an electric light which is extinguished when the arm is in upright or inoperative position but which is automatically energized so as to display a warning light when the signal arm is projected into its horizontal signalling position.

Another object of the invention is to provide a signal device of this character in which gravity is relied upon to move the signal arm from upright to horizontal position upon release of an electrically operated catch, and in which a motor is provided for the purpose of restoring the signal arm to its normal or upright position upon the completion of a turn.

A further object is to provide a device of this character which may be easily attached to some convenient portion of the side of a motor vehicle without involving any alterations therein.

An additional object is to provide a device of this character which will be simple and inexpensive to make, easy to install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of the device showing it mounted upon a motor vehicle, the normal or upright position being shown by full lines and the signalling position by dot and dash lines, Figure 2 is a perspective view of the device with a portion of the arm broken away, Figure 3 is a vertical sectional view, Figure 4 is a longitudinal sectional view with the arm shown in signalling position, Figure 5 is a diagram of the electric circuits.

Referring more particularly to the drawings the letter A designates a portion of the side of an automobile, this portion being preferably a corner post at the windshield, and B designates the steering wheel.

In carrying out the invention I provide a casing 10 carried by a suitable shaped bracket 11, here represented as angular, secured on the corner post A by any suitable means such as screws 12. Projecting laterally from the outer face of the bracket 11 are ears 13 between which is pivoted, as by a bolt 14, the inner end of a signal arm 15 which is hollow and which is preferably shaped to resemble the human arm. This arm terminates in a hand 16 formed with an opening covered by transparent or translucent material 17 which is preferably of a yellow color to indicate caution. Moreover it is preferred that the hand bear the legend "Caution" as indicated in Figure 1. Rotatably engaged about the bolt 14 are eyes 18 formed in a rod member which is bent to define an elongated loop 19 of substantially U shape embracing and engaging against the under or outer side of the arm 15, this rod member being also bent to provide a retaining arm 20 located above the casing 10, and being additionally bent to provide a stop arm 21 which is located outwardly of but adapted to engage against the bracket 11 under certain circumstances to be described.

Normally the signal arm 15 is intended to be in upright or vertical position and is held so by means of a latch 22 which is vertically arranged and pivoted at 23 within the casing 10. This latch projects through an opening in the top of the casing and is urged away from the signal arm 15 by a coil spring 24. The latch has an inclined surface 25 and a shoulder 26 beneath the latter of which is normally engaged the retaining arm 20. In order that the latch 22 may be withdrawn from engagement with the retaining arm 20 so that the signal arm 15 may drop to signalling position, I provide within the casing 10 an electromagnet 27 adapted to attract an armature 28 on the latch when the electro-magnet is energized by pressing upon the proper one of two push buttons 29 and 30 located within convenient reach of the driver, preferably upon the steering wheel B.

For returning the arm from horizontal signalling position shown in Figures 1 and 4 into its normal upright position as shown in Figures 1 and 3, I provide within the casing 10 a small electric motor 31 having one end of its shaft equipped with a spool or reel 32 to which is secured and about which is wrapped a flexible member 33, such as a cord, which extends through an eyelet 34 in the top of the casing and which is connected with the end of the retaining arm 20, the idea being that when the motor is energized by pressing upon the push button 30 the spool will wind up the flexible member 33 which is of course unwound when the signal arm 15 is permitted to drop into signalling position. Any desired form of slippage connection may be provided between the motor shaft and the spool 32 for preventing breaking of the cord or burning out of the motor in case the motor is permitted to run longer than necessary, or some conventional type of circuit breaker may be provided for cutting off the motor when the flexible member has been wound onto the spool the necessary extent to raise the signal arm to vertical position.

Located within the hollow signal arm is a transverse supporting member 35 carrying a socket 36 receiving the base of an incandescent bulb 37, the base of the bulb having its central contact bearing against a contact 38 mounted within the arm and insulated therefrom. Mounted on and insulated from the arm near the pivot thereof is a spring contact 39 connected by a wire 40 with the contact 38 and adapted to engage a rigid contact 41 mounted upon and insulated from the bracket 11, this contact 39 engaging the contact 41 when the arm is in signalling position.

The electrical connections are as follows. The storage battery 42 of the vehicle has one terminal grounded in the usual manner and has its other terminal connected by a conductor 43 with the movable members of the push buttons 29 and 30. Leading from the conductor 43 is a wire 44 which connects with the contact 41. The stationary element of the push button 29 is connected by a wire 45 with one terminal of the electro-magnet 27 which has its other terminal grounded, while the stationary element of the push button 30 is connected by a wire 46 with the electric motor 31 which has its other terminal grounded. The lamp 37 is of the single contact type and is grounded owing to the mounting of the socket 36 on the arm 15.

In the operation, it will be understood that normally the signal arm is in upright position as shown in Figures 1 and 3. When the driver contemplates making a turn or stopping, he presses on the push button 29, whereupon current will flow from the battery 42, through the conductor 43, push button 29, conductor 45, electro-magnet 27, to the ground, and thence back to the battery. The energization of the magnet 27 attracts the latch 22 and releases it from the retaining arm 20 whereupon the weight of the signal arm will cause it to drop, the force of the drop being cushioned by engagement of the spring stop arm 21 with the bracket 11. When the arm thus drops the spring contact 39 engages the stationary contact 41 and current flows from the battery 42, wire 43, wire 44, contact 41, contact 39, wire 40, lamp 37, to the ground, and back to the battery, thus energizing the lamp 37 and showing a colored light, preferably yellow, through the glass or cellulose pane 17 in the hand 16, thus warning the drivers of other vehicles, pedestrians and traffic officers of a contemplated turn or stop so that other drivers may govern their cars accordingly and prevent accident.

After a turn or stop has been completed and the signal is no longer needed, the operator presses upon the push button 30 whereupon current will flow from the battery 42, through the conductor 43, push button 30, wire 46, and motor 31 to the ground, and thence back to the battery. The motor will then operate and will rotate the spool 32 which will wind up the cord 33 which has been previously pulled out when the signal arm dropped to signalling position, as will be clearly understood. The contact is of course broken between the contacts 39 and 41 and the lamp 37 is extinguished just as soon as the signal arm starts its upward movement. When the arm reaches its upright position, the retaining arm 20 will ride over the inclined surface 25 of the latch, moving the latch back against the resistance of the spring 24 until the arm 20 engages beneath the shoulder 26. The signal arm 15 is thus held against movement until the push button 29 is again operated to release the latch when the next signal is needed.

From the foregoing description and a study of the drawings it will be apparent that I have thus provided a very simply constructed and inexpensive device which may be easily attached to an automobile and which will be very efficient in giving a warning signal so that danger of accident will be greatly reduced.

While I have shown and described the preferred embodiment of the invention, it should be understood that the disclosure is merely an exemplification of the principles involved as the right is reserved to make all such changes in the details of construction as will widen the field of utility and increase the adaptabilty of the device provided such changes constitute no departure from the spirit of the invention or the scope of the claims hereunto appended.

Having thus described the invention, I claim:

1. A direction signal device comprising a support adapted to be mounted upon the side of a vehicle, a casing on the support, a signal arm having a pivot on said support and movable from normally vertical to horizontal signalling position, a U shaped member embracing and engaged beneath said arm and pivoted at the pivot of the arm, said U shaped member having one end formed with a laterally extending retaining arm, a spring pressed latch pivoted within the casing and engageable by said retaining arm for normally maintaining the signal arm in upright position, means for releasing said latch to permit the signal arm to drop, a member connected with said retaining arm, and means connected with the member for returning the arm from dropped to raised position.

2. A direction signal device comprising a support adapted to be mounted upon the side of a vehicle, a casing on the support, a signal arm having a pivot on the support and movable from normally vertical to horizontal signalling position, a U shaped member embracing and engaged beneath said arm and pivoted at the pivot of the arm, said U shaped member having one end forming a laterally extending retaining arm, said arm extending over said casing, said member having the other end forming a stop arm adapted to engage the support when the signal arm is lowered to horizontal position, a spring pressed latch pivoted within the casing and projecting upwardly through an opening in the top of the casing to intercept the retaining arm for normally maintaining the signal arm in upright position, means for releasing said latch to permit the signal arm to drop, and means connected with said retaining arm for returning the arm from dropped to raised position.

JAMES JONES.